(12) United States Patent
Angelilli et al.

(10) Patent No.: US 12,124,871 B2
(45) Date of Patent: Oct. 22, 2024

(54) CONTROLLING INVOCATIONS OF A SOFTWARE COMPONENT BASED ON ESTIMATION OF RESIDUAL CAPABILITY THEREOF

(71) Applicant: International Business Machines Corporation, Armonk, NY (US)

(72) Inventors: Riccardo Angelilli, Rome (IT); Michele Crudele, Rome (IT); Francesca De Cicco, Rome (IT); Novella Panfili, Rome (IT); Andrea Innocenti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 17/475,641

(22) Filed: Sep. 15, 2021

(65) Prior Publication Data
US 2023/0080849 A1 Mar. 16, 2023

(51) Int. Cl.
*G06F 9/48* (2006.01)
*G06F 9/50* (2006.01)
*G06F 9/54* (2006.01)
*G06F 11/30* (2006.01)
*G06F 11/34* (2006.01)
(Continued)

(52) U.S. Cl.
CPC ............ *G06F 9/4881* (2013.01); *G06F 9/505* (2013.01); *G06F 9/542* (2013.01); *G06F 11/302* (2013.01); *G06F 11/3433* (2013.01); *H04L 47/263* (2013.01); *H04L 47/28* (2013.01); *G06F 2209/482* (2013.01);
(Continued)

(58) Field of Classification Search
None
See application file for complete search history.

(56) References Cited

U.S. PATENT DOCUMENTS 10,536,332 B1 * 1/2020 Hussain ............. H04L 41/0895
11,032,160 B1   6/2021 Raheja
(Continued)

OTHER PUBLICATIONS

"Limiting Outbound Traffic Within Your Network by Configuring an Egress Single-Rate Two-Color Policer and Configuring Multifield Classifiers", Juniper.net, Dec. 5, 2019, Product and Release Support, TechLibrary, Junos OS, Class of Service User Guide (Routers and EX9200 Switches), 22 pages.
(Continued)

*Primary Examiner* — Abu Zar Ghaffari
(74) *Attorney, Agent, or Firm* — Joseph P. Curcuru

(57) ABSTRACT

A solution is proposed for controlling invocations of a target component by multiple source components in a software application. A corresponding method comprises associating a plurality of source components in a software application with one or more corresponding source rates for invoking a target component in the software application; monitoring corresponding invocations of the target component by a number of instances of the plurality of source components; receiving an enablement request for a new invocation of the target component from a current instance of a current source component; verifying an enablement of the new invocation; estimating a serving probability indicative of a residual capability of the target component to serve the new invocation; and enabling the new invocation according to the serving probability.

20 Claims, 7 Drawing Sheets

(51) Int. Cl.
*H04L 47/263* (2022.01)
*H04L 47/28* (2022.01)

(52) U.S. Cl.
CPC ............... *G06F 2209/5019* (2013.01); *G06F 2209/5022* (2013.01); *G06F 2209/508* (2013.01)

(56) References Cited

U.S. PATENT DOCUMENTS

| | | | |
|---|---|---|---|
| 2012/0163175 A1 | 6/2012 | Gupta | |
| 2013/0091241 A1 | 4/2013 | Goetz | |
| 2014/0177818 A1* | 6/2014 | Chang | H04M 3/5183 379/265.09 |
| 2014/0223023 A1* | 8/2014 | Shen | H04L 67/1012 709/228 |
| 2015/0043722 A1* | 2/2015 | Fujimoto | H04M 3/2263 379/112.04 |
| 2015/0100630 A1* | 4/2015 | Xiao | G06F 9/505 709/203 |
| 2015/0373022 A1 | 12/2015 | Dubman | |
| 2017/0019453 A1* | 1/2017 | Panje | H04L 65/764 |
| 2019/0245804 A1 | 8/2019 | Martin | |
| 2019/0342217 A1 | 11/2019 | Mazurek | |
| 2020/0052957 A1 | 2/2020 | Tubillara | |
| 2021/0224102 A1* | 7/2021 | Desikachari | G06F 11/3452 |
| 2022/0035689 A1* | 2/2022 | Raheja | G06F 9/5011 |

OTHER PUBLICATIONS

Authors et. al.: Disclosed Anonymously, "Bandwidth Management within Cloud Network Infrastructures", An IP.com Prior Art Database Technical Disclosure, IP.com No. IPCOM000213419D, IP.com Electronic Publication Date: Dec. 14, 2011, 6 pages.

Wippler, Derrick, "Gubernator: Cloud-native distributed rate limiting for microservices", Mailgun by Pathwire, Last updated on Sep. 10, 2020, 12 pages, <https://www.mailgun.com/blog/gubernator-cloud-native-distributed-rate-limiting-microservices/>.

Anonymous: "Rate-limiting strategies and techniques," Cloud Architecture, Google Cloud, Aug. 29, 2019, pp. 1-12. https://cloud.google.com/architecture/rate-limiting-strategies-techniques (retrieved Dec. 6, 2022).

Simpson J: "Everything you Need to Know About API Rate Limiting," Nordic APIx Website, Apr. 18, 2019, 13 pages. https://nordicapis.com/everything-you-need-to-know-about-api-rate-limiting/ (retrieved Dec. 6, 2022).

International Search Report and Written Opinion for Application No. PCT/EP2022/075239, Dec. 21, 2022, 13 pages.

* cited by examiner

CONTROLLING INVOCATIONS OF A SOFTWARE COMPONENT BASED ON ESTIMATION OF RESIDUAL CAPABILITY THEREOF

BACKGROUND OF THE INVENTION

The present disclosure relates generally to information technology, and more specifically to the control of invocations of components of software applications.

Software applications are generally broken into multiple software components that interact among them. A typical example is in cloud computing environments, wherein the software components may implement corresponding services, and particularly micro-services. In each software application, the software components may invoke the other software components to provide the required functionality of the whole software application. This architecture provides modularity, increases scalability, facilitates integration and fosters cooperative development. Moreover, each software component may be deployed with one or more instances thereof, even in different locations.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

An embodiment of the present disclosure provides a method, a computer program product, and a computer system for controlling invocations of a target component. The method includes associating, by one or more computer processors, a plurality of source components in a software application with one or more corresponding source rates for invoking a target component in the software application, wherein the one or more corresponding source rates are within a target rate for invoking the target component. The method further includes monitoring, by the one or more computer processors, corresponding invocations of the target component by a number of instances of the plurality of source components. The method further includes receiving, by the one or more computer processors, an enablement request for a new invocation of the target component from a current instance of a current source component. The method further includes verifying, by the one or more computer processors, an enablement of the new invocation based, at least on part, on: (i) a source rate of the current source component, and (ii) corresponding invocations of the target component by a number of instances of the current source component. Responsive to a negative result of the verifying, the method further includes estimating, by the one or more computer processors, a serving probability indicative of a residual capability of the target component to serve the new invocation, wherein the serving probability is estimated based, at least in part, on: (i) the target rate, and (ii) the invocations of the target component by the number of instances of the plurality of source components. The method further includes enabling, by the one or more computer processors, the new invocation according to the serving probability.

DETAILED DESCRIPTION

Figure 1A:
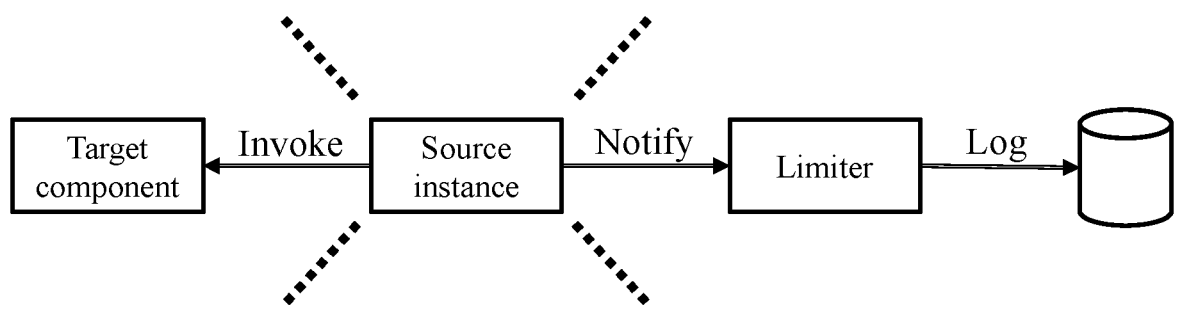
FIG. 1A show general features of a solution according to an embodiment of the present disclosure.

With reference in particular to FIG. 1A-FIG. 1F, general features of a solution according to an embodiment of the present disclosure are shown.

In many cases, it is difficult (if not impossible) to foresee an actual workload of software components, especially when the workload is variable over time in an unpredictable way (such as typical of the cloud environments). Therefore, the software components (configured for standard workload conditions) may be unable to sustain peak conditions of their workload. In order to avoid overloading the software components, ingress/egress limiting mechanisms may be implemented.

Particularly, an ingress limiting mechanism limits a rate of invocations that a target (software) component accepts from other source (software) components. For this purpose, a (target) rate that the target component may tolerate overall is defined; once the target rate has been reached, the target component refuses further invocations (so as to prevent degrading its performance).

However, many software components may lack any ingress limiting mechanism. This is especially true in cloud environments for software components that are not cloud-native (such as legacy systems, like systems of record); indeed, these software components, also known as integration points, are generally integrated into the cloud environments without being re-engineered for this purpose.

Vice-versa, an egress limiting mechanism limits a rate of the invocations that the source components are allowed to submit to the target component. For this purpose, each source component is assigned a (source) rate defined by a corresponding slice of the target rate being reserved thereto; once the source rate has been reached, the source component stops submitting further invocations to the target component (so as to prevent overwhelming it).

However, the above-mentioned egress limiting mechanism is ineffective in complex scenarios (as typical of the cloud environments). Particularly, the source components may be horizontally scaled with multiples instances thereof that are deployed dynamically according to their workload.

The instances of each source component may run in isolation (for example, in different containers or virtual machines). Therefore, it is very difficult (if not impossible) for the source components to share their source rate among the instances thereof. Indeed, the instances change continually, and they may be even completely unknown to the source components (for example, when they are implemented by different cloud providers in a multi-cloud architecture and/or when they run in clusters of processing nodes).

In any case, the above-mentioned egress/ingress limiting mechanisms are quite rigid. Particularly, these mechanisms do not allow coping dynamically with changing conditions of the target component and/or with changing needs of the source components. Moreover, they do not provide an optimized sharing of the total rate of the target component among the source components. Indeed, some source components may experience a shortage of their source rates in transient peak conditions. This may cause performance degradations of the whole software application (which may be unacceptable in many practical situations) or the need of providing additional computing resources for ensuring the required performance of the software application in any situations. Vice-versa, some source components may experience an excess of their source rates in transient idle conditions. This may cause a waste of corresponding computing resources that remain unused.

Starting from FIG. 1A, a software application (for example, implemented in a cloud environment) comprises a plurality of software components that interact among each other. Particularly, a target (software) component, or more (for example, an integration point) may be invoked by a plurality of source (software) components (for example, micro-services), each one deployed with one or more instances thereof in a computing infrastructure (for example, running in one or more processing nodes, possibly grouped into clusters, of one or more cloud providers). The target component has a target rate of the (received) invocations, and each source component is associated with a corresponding source rate of the (submitted) invocations where, for example, both the target rate and the source rate are provided in terms of (maximum) number/second. The target rate defines the invocations that the target component may tolerate (with acceptable performance). The source rate of each source component includes a corresponding slice of the target rate that is reserved to the source component, defining the invocations that the source component is allowed to submit to the target component.

In a solution according to an embodiment of the present disclosure, a limiter (for example, implemented by a distinct software component) monitors all the invocations of the target component. For example, for this purpose the instances of the source components notify a start time and an end time of every invocation of the target component submitted by them. The limiter logs the received notifications, so as to build historical information relating to the (previous) invocations of the target component.

Figure 1B:
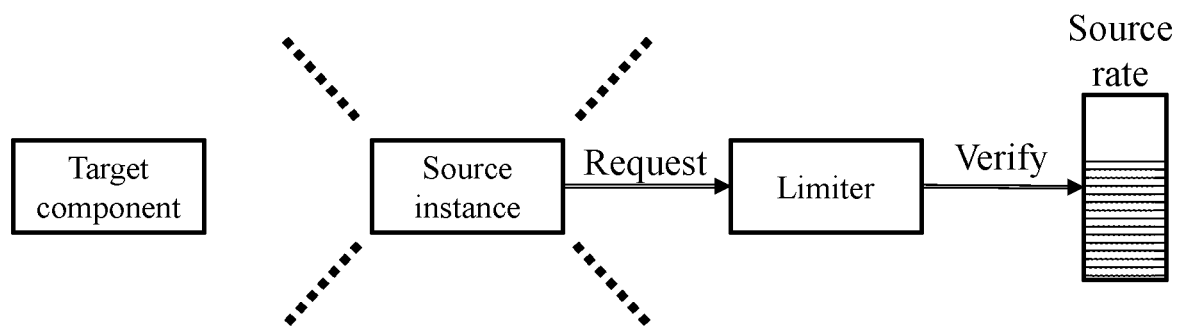
FIG. 1B show general features of a solution according to an embodiment of the present disclosure.

Moving to FIG. 1B, whenever any (current) instance of any (current) source component needs to submit a (new) invocation of the target component, at first the instance submits a corresponding enablement request to the limiter. In response thereto, the limiter verifies an enablement of the new invocation. Particularly, the enablement is verified according to the source rate of the current source component and to the (previous) invocations of the target component by all the instances of the current source component (for example, their current rate in a last timeframe). In the situation shown in the figure, the result of this verification is positive since the invocations of the target component by the instances of the current source component have not reached the source rate yet (for example, because the current rate is lower than the source rate).

Figure 1C:
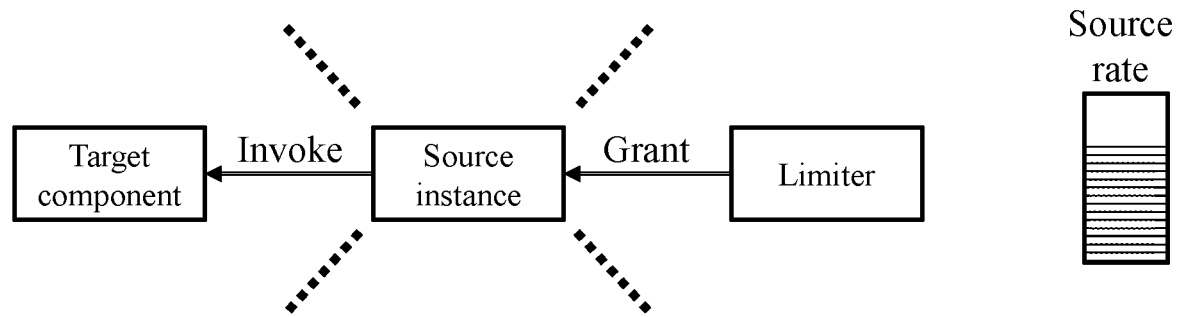
FIG. 1C show general features of a solution according to an embodiment of the present disclosure.

Moving to FIG. 1C, in this case the limiter grants the enablement of the new invocation. Therefore, the current instance submits the new invocation to the target component as usual.

Figure 1D:
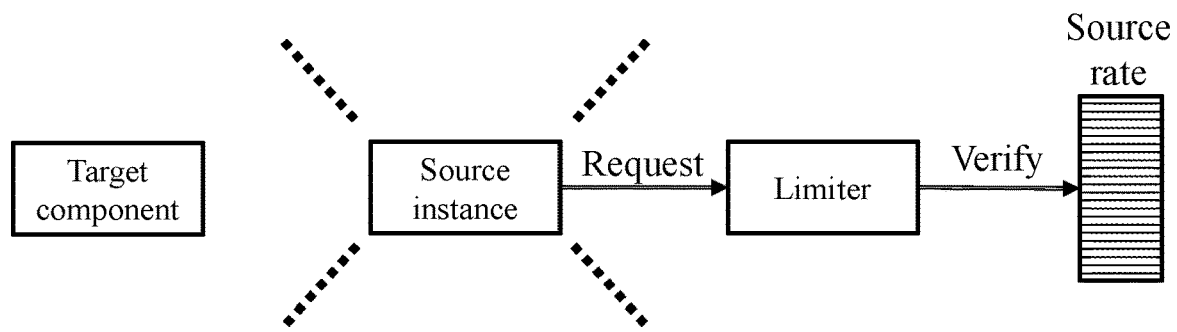
FIG. 1D show general features of a solution according to an embodiment of the present disclosure.

Moving to FIG. 1D, a different situation is shown wherein the result of the same verification (of the enablement of the new invocation) is instead negative, since the invocations of the target component by the instances of the current source component have already reached the source rate (for example, because the current rate is not lower than the source rate).

Figure 1E:
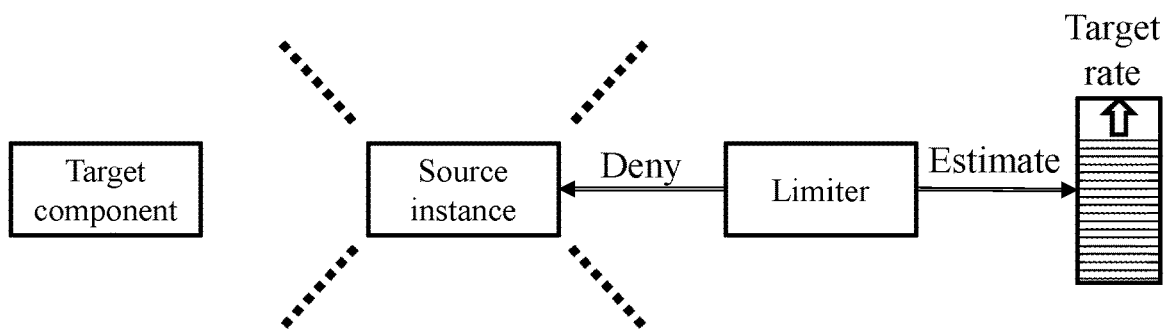
FIG. 1E show general features of a solution according to an embodiment of the present disclosure.

Moving to FIG. 1E, in this case the enablement of the new invocation would normally be denied. In a solution according to an embodiment of the present disclosure, instead, the limiter estimates a serving probability, which is indicative of a residual capability of the target component to serve the new invocation. The serving probability is estimated according to the target rate and to the invocations of the target component by the instances of all the source components. For example, the serving probability is defined by the probability of any further invocations of the target component (by the instances of the other source components) in a short time. In the situation shown in FIG. 1E, the serving probability indicates that the new invocation may not be tolerated by the target component (for example, because a total rate of the invocations of the target component in a last timeframe has already reached the target rate). In this case, the limiter denies the enablement of the new invocation.

Figure 1F:
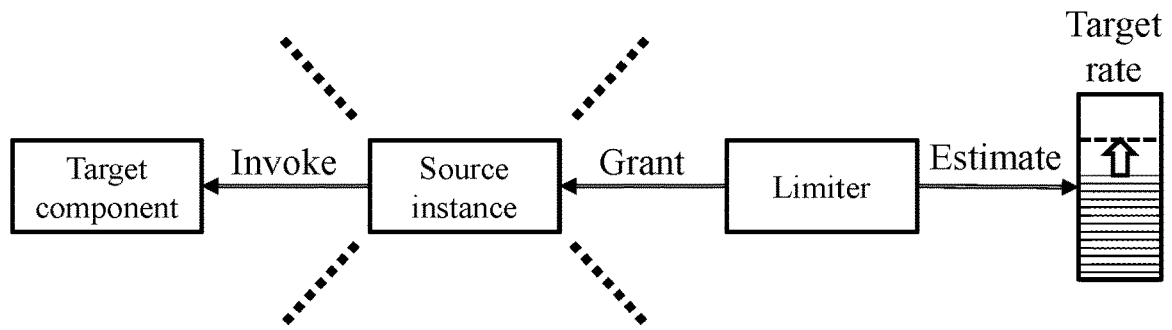
FIG. 1F show general features of a solution according to an embodiment of the present disclosure.

Moving to FIG. 1F, a different situation is shown wherein the serving probability instead indicates that the new invocation may be tolerated by the target component (for example, because the total rate is lower than the target rate and no further invocation of the target component is likely during an average duration of the new invocation). In this case, the limiter grants the enablement of the new invocation (irrespectively of the reaching of the source rate by the current source component). Therefore, the current instance again submits the new invocation to the target component as usual.

The above-described solution is of general applicability for preventing overloads of the target component (by limiting invocations of the target component to a rate that the target component may tolerate with acceptable performance). Particularly, this is especially advantageous when the source components are horizontally scaled, with their instances running in isolation (for example, in different containers or virtual machines). Indeed, the desired result may be achieved even when the source components are completely agnostic about their instances (for example, because the source components are implemented by different cloud providers in a multi-cloud architecture and/or run in clusters of processing nodes).

Moreover, in this way it is possible to optimize a sharing of the target rate among the source components. Indeed, the source components are allowed to exceed their source rates (temporarily) when this is likely not to adversely affect operation of the target component; in this way, any source components experiencing shortages of their source rates may exploit possible excesses of the source rates of other source components.

As a result, the invocations of the target component self-adapt dynamically to contingent needs. This reduces performance degradations of the corresponding software application (since a whole capability of the target component to serve the target component's invocations is exploited as far as possible by all the source components). Therefore, it is possible to save computing resources at the same time maintaining the required performance in any situations (comprising peak conditions of the workloads of every source component).

Figure 2:
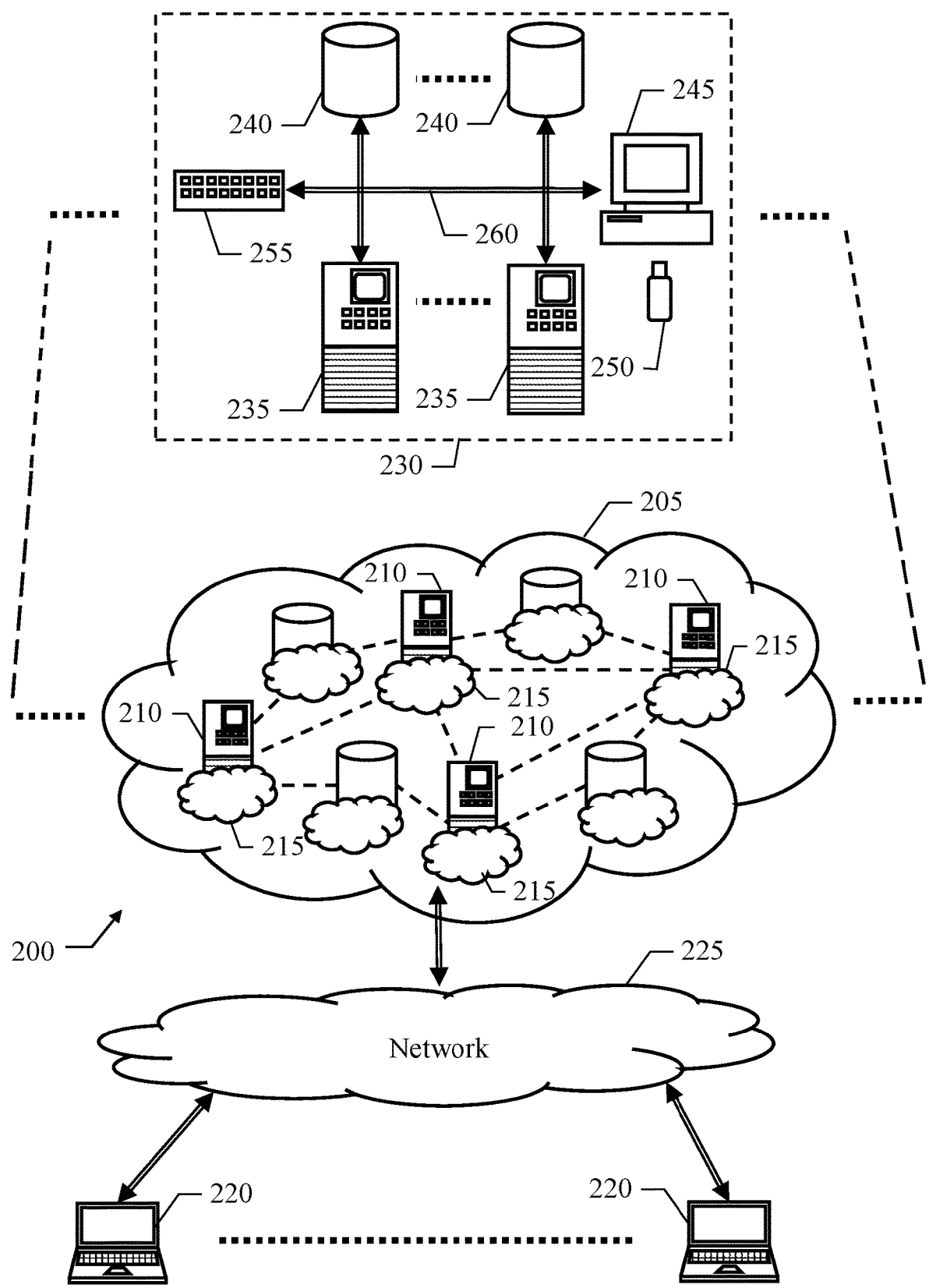
FIG. 2 shows a schematic block diagram of a computing infrastructure wherein a solution according to an embodiment of the present disclosure may be practiced.

With reference now to FIG. 2, a schematic block diagram is shown of a computing infrastructure 200 wherein a solution according to an embodiment of the present disclosure may be practiced.

The computing infrastructure 200 comprises one or more cloud providers 205 (only one detailed in the figure). Each cloud provider 205 is an entity that provides a pool of computing resources as cloud services (i.e., shared computing resources that may be provisioned, configured and released very rapidly); the computing resources (generally of the virtual type, i.e., emulations by software of physical computing resources) are provided upon request to users of the cloud provider 205, so that each user has the sole control of the computing resources (which may then be used exactly as if they were dedicated to the user). The computing resources may be provided according to several service models, particularly, Infrastructure as a Service (IaaS), Platform as a Service (PaaS), Software as a Service (SaaS) and Network as a Service (NaaS). Moreover, the computing resources may be provided according to different deployment models, particularly, public cloud (i.e., for the general public), private cloud (i.e., for a single organization), community cloud (i.e., for several organizations) or hybrid cloud (based on a combination of different deployment models).

The cloud services are implemented by a plurality of processing nodes 210 of each cloud provider 205. For example, each processing node 210 is a Virtual Machine (VM), which emulates a whole physical computing machine with a full copy of an operating system and one or more software applications running on top of it; in addition, or in alternatively, each processing node 210 is a container, which emulates an (isolated) application environment running on a (shared) operating system (exploiting resource isolation features provided by it). The processing nodes 210 may be organized in clusters 215. Each cluster 215 comprises a plurality of processing nodes 210, all performing the same tasks. The cluster 215 acts as a single logical entity, which provides one or more cloud services in response to corresponding requests submitted thereto from the outside; the cluster 215 automatically assigns the requests to its processing nodes 210 that are best suited to their handling (so as to provide parallel processing and/or high availability).

The users connect to the cloud providers 205 with corresponding client computing machines, or simply clients, 220 (for example, of the thin type) via a (communication) network 225; for example, the network 225 may be the Internet for a public/community cloud or a LAN for a private cloud. For this purpose, each cloud provider 205 exposes a frontend sub-system for accessing it (for example, via web browsers of the clients 220); the frontend sub-system interfaces with a backend sub-system actually implementing the corresponding cloud services (which backend sub-system is not accessible from the outside, so that the users are completely agnostic about its location and configuration).

The processing nodes 210 of each cloud provider 205 run in one or more server farms 230 (only one detailed in the figure). Each server farm 230 comprises multiple server computing machines, or simply servers, 235 (for example, of the rack or blade type) and multiple storage disks 240 (for example, of the RAID type) implementing mass-memories thereof; in turn, each server 235 comprises (not shown in the figure) one or more microprocessors (μP) providing a logic capability of the server 235, a non-volatile memory (ROM) storing basic code for a bootstrap of the server 235 and a volatile memory (RAM) used as a working memory by the microprocessors. The server farm 230 also comprises a console 245 for controlling it (for example, a personal computer, also provided with a drive for reading/writing removable storage units 250, such as of USB type). A switch/router sub-system 255 manages any communications among the servers 235, the disks 240 and the console 245, and with the network 225; for this purpose, the servers 235, the disks 240 and the console 245 are connected to the switch/router sub-system 255 (thanks to corresponding network adapters) via a cabling sub-system 260.

Figure 3:
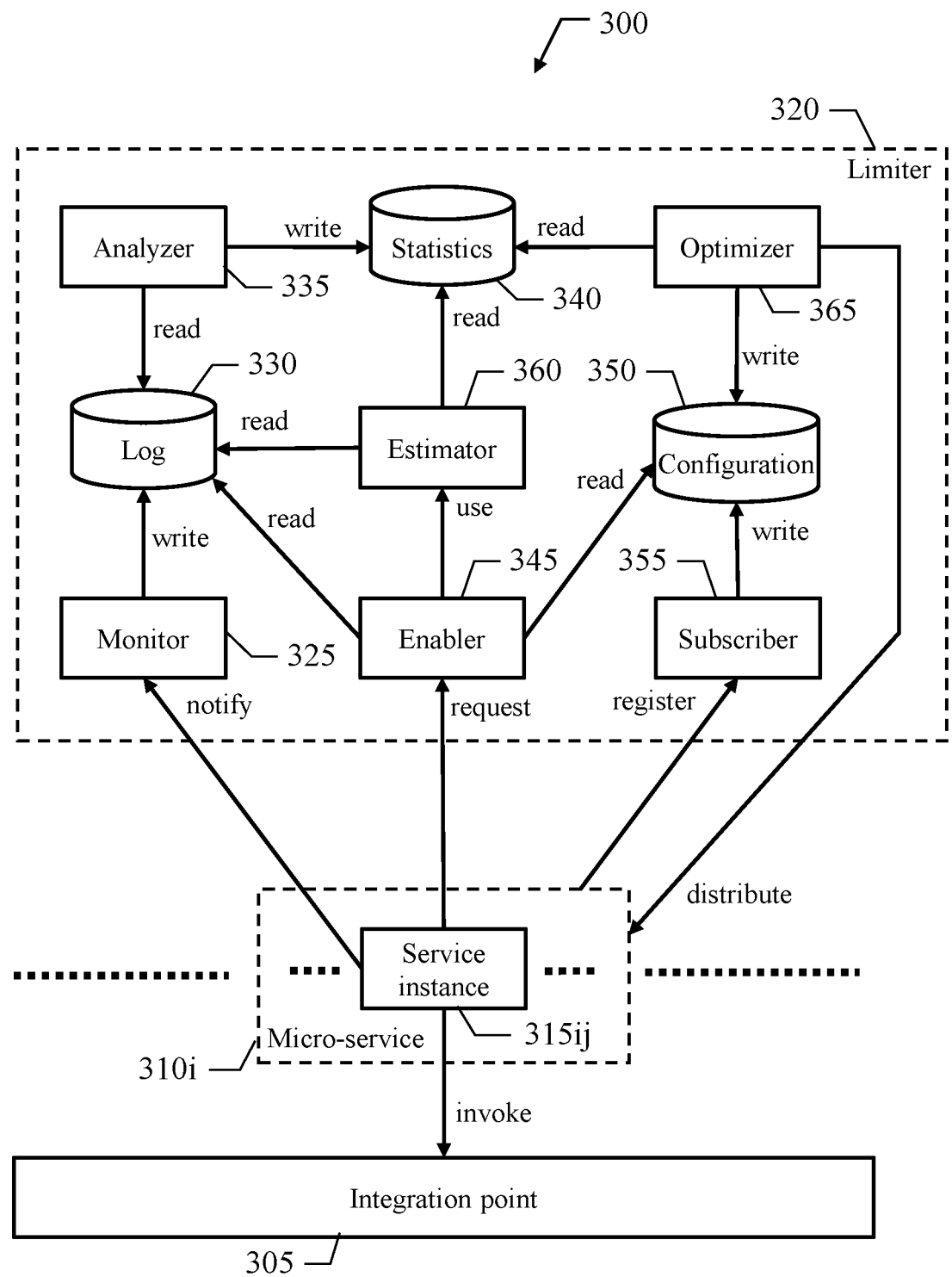
FIG. 3 shows software components that may be used to implement a solution according to an embodiment of the present disclosure.

With reference now to FIG. 3, software components are shown that may be used to implement a solution according to an embodiment of the present disclosure.

All the software units (programs and data) are denoted as a whole with the reference software units 300. The software units 300 are typically stored in the mass memories and loaded (at least in part) into the working memories of the servers when the programs are running. The programs are installed into the mass memories, for example, by reading from removable storage units and/or by downloading from the network. In this respect, each program may be a module, segment or portion of code, which comprises one or more executable instructions for implementing the specified logical function.

Each cloud service is implemented by a software application comprising a plurality of software components. Particularly, the software components comprise an integration point 305 (or more). The integration point 305 is a software component that is not cloud-native and that has been integrated into the cloud environment without being re-engineered for this purpose (and then it lacks any ingress limiting mechanism). Typically examples of the integration point 305 are legacy (software) systems, which are based on an outdated technology but that still serve critical business needs (such as systems of records guaranteeing validity and integrity of information); the legacy systems continue to be used for a number of reasons (such as costs, complexity, time, availability, knowledge, security and so on). The integration point 305 runs in a corresponding processing node (of a cloud provider). The software components further implement a plurality of micro-services 310$i$, each deployed with one or more (micro-service) instances 315$ij$ thereof. Each micro-service 310$i$ (as any other service) provides a stand-alone functionality, independent of its implementation, which may be requested through a well-defined interface; particularly, the micro-service 310$i$ is relatively small in size, fine-grained (to perform a single function), independently deployable and accessible through a lightweight protocol (such as the HTTP). The micro-service instances 315$ij$ run in corresponding processing nodes of a single cloud provider or of multiple cloud providers (in a single-cloud or multi-cloud, respectively, implementation of the corresponding software application). Particularly, a resource manager of each cloud provider (not shown in the figure) deploys the instances 315$ij$ of each micro-service 310$i$ dynamically according to a current workload of the micro-service 310$i$ (in order to maintain desired performance thereof). The micro-service instances 315$ij$ are deployed onto independent processing nodes or clusters; in turn, each cluster runs the corresponding micro-service instance 315$ij$ on or more of its processing nodes, which are selected dynamically according to its workload. The micro-service instances 315*ij* (acting as source components) invoke the integration points 305 (acting as target component) by submitting corresponding invocations thereto.

In the solution according to an embodiment of the present disclosure, a limiter 320 (running in a processing node of a cloud provider) controls the invocations of the integration points 305 by the micro-service instances 315*ij*. The limiter 320 comprises the following modules. A monitor 325 monitors the invocations of the integration points 305. The monitor 325 receives corresponding notifications from the micro-service instances 315*ij* (for example, at the start and at the end of each invocation). The monitor 325 writes a log repository 330 that stores historical information relating to the (previous) invocations of the integration points 305. For example, the log repository 330 comprises an entry for each integration point 305, which lists the invocations thereof; for each invocation, the list comprises an entry that indicates the micro-service 310*i* whose instance 315*ij* has invoked the integration point 305, a start time of the invocation, an end time of the invocation and a result of the invocation (such as succeeded or failed). An analyzer 335 calculates one or more statistical parameters of the invocations of the integration points 305; for example, the statistical parameters comprise an average duration and an error rate of the invocations of the integration points 305. The analyzer 335 reads the log repository 330 and writes a statistics repository 340. The statistics repository 340 comprises an entry for each integration point 305, which stores the values of the statistical parameters over time.

An enabler 345 enables the (new) invocations of the integration points 305. The enabler 345 receives the corresponding enablement requests from the micro-service instances 315*ij*. The enabler 345 reads the log repository 330 and a configuration repository 350. The configuration repository 350 stores configuration information of the limiter 320. For example, the configuration repository 350 comprises an entry for each integration point 305. The entry stores the target rate of the integration point 305, defined by a maximum frequency of its invocations that the integration point 305 may tolerate (such as number of invocations per second); moreover, the entry stores a timeout for the invocations of the integration point 305. The entry then lists the micro-services 310*i* that are registered at the limiter 320 with the integration point 305 for invoking it; the list comprises an entry for each (registered) micro-service 310*i* that stores its source rate, defined by a maximum frequency of the invocations of the integration point 305 that the instances 315*ij* of the micro-service 310*i* are allowed to submit to the integration point 305 (a slice of the target rate reserved to the micro-service 310*i*, again number of invocations per second). A subscriber 355 manages the registrations (subscriptions) of the micro-services 310*i* to the integration points 305. The subscriber 355 is used by the micro-services 310*i* (i.e., the first instances 315*ij* thereof that are deployed) for registering with the integration points 305. For this purpose, the subscriber 355 writes the configuration repository 350. The enabler 345 also uses an estimator 360, which estimates the serving probability of the integration points 305. The estimator 360 reads the log repository 330 and the statistics repository 340. An optimizer 365 optimizes the invocations of the integration points 305. The optimizer 365 reads the statistics repository 340 and it writes the configuration repository 350. Moreover, the optimizer 365 distributes the timeouts of the integration points 305 to the micro-services 310*i* that are registered with them (i.e., to the first instances 315*ij* thereof that has registered at the limiter).

Figure 4A:
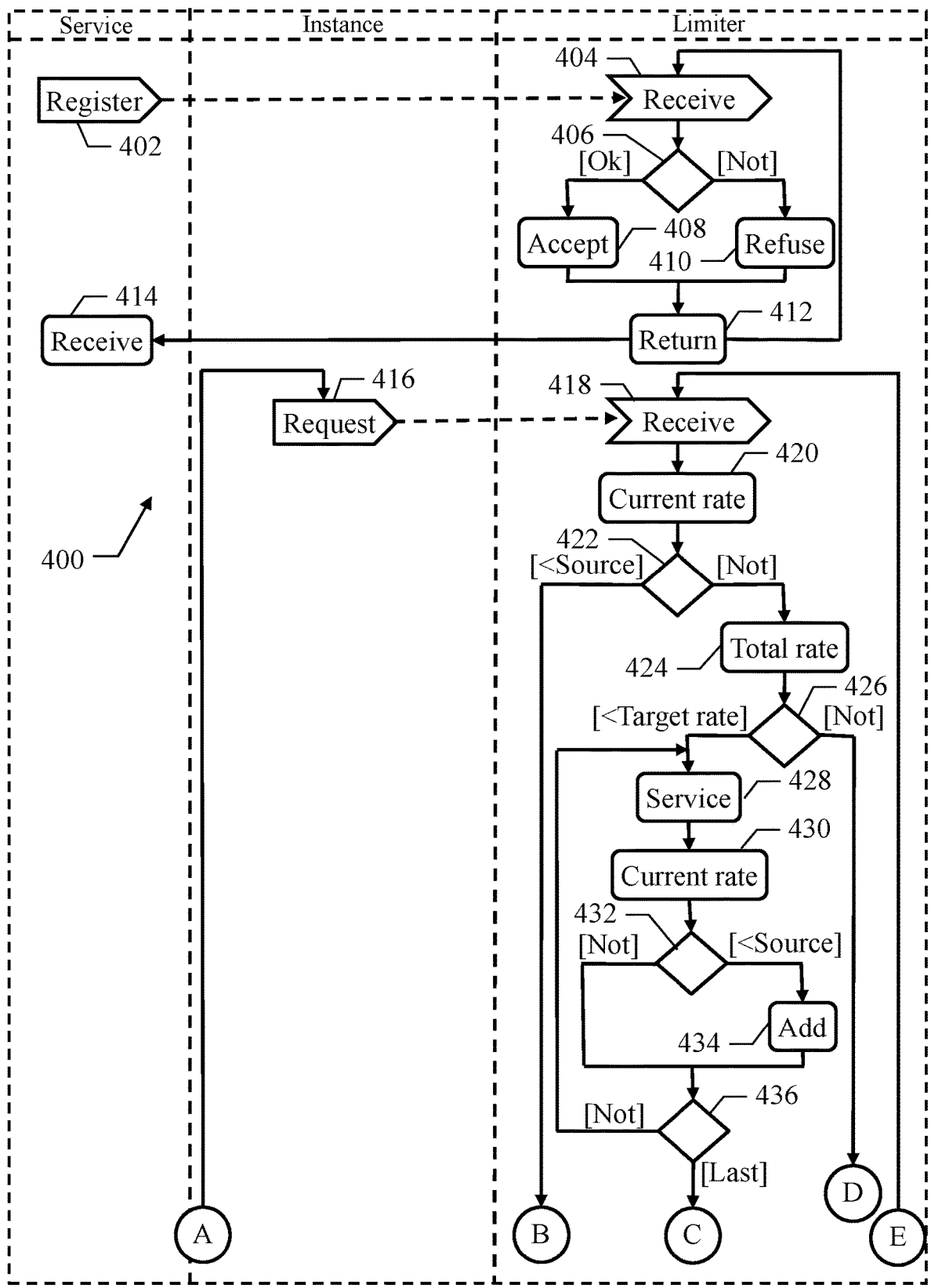
FIG. 4A show an activity diagram describing a flow of activities relating to an implementation of a solution according to an embodiment of the present disclosure.
Figure 4B:
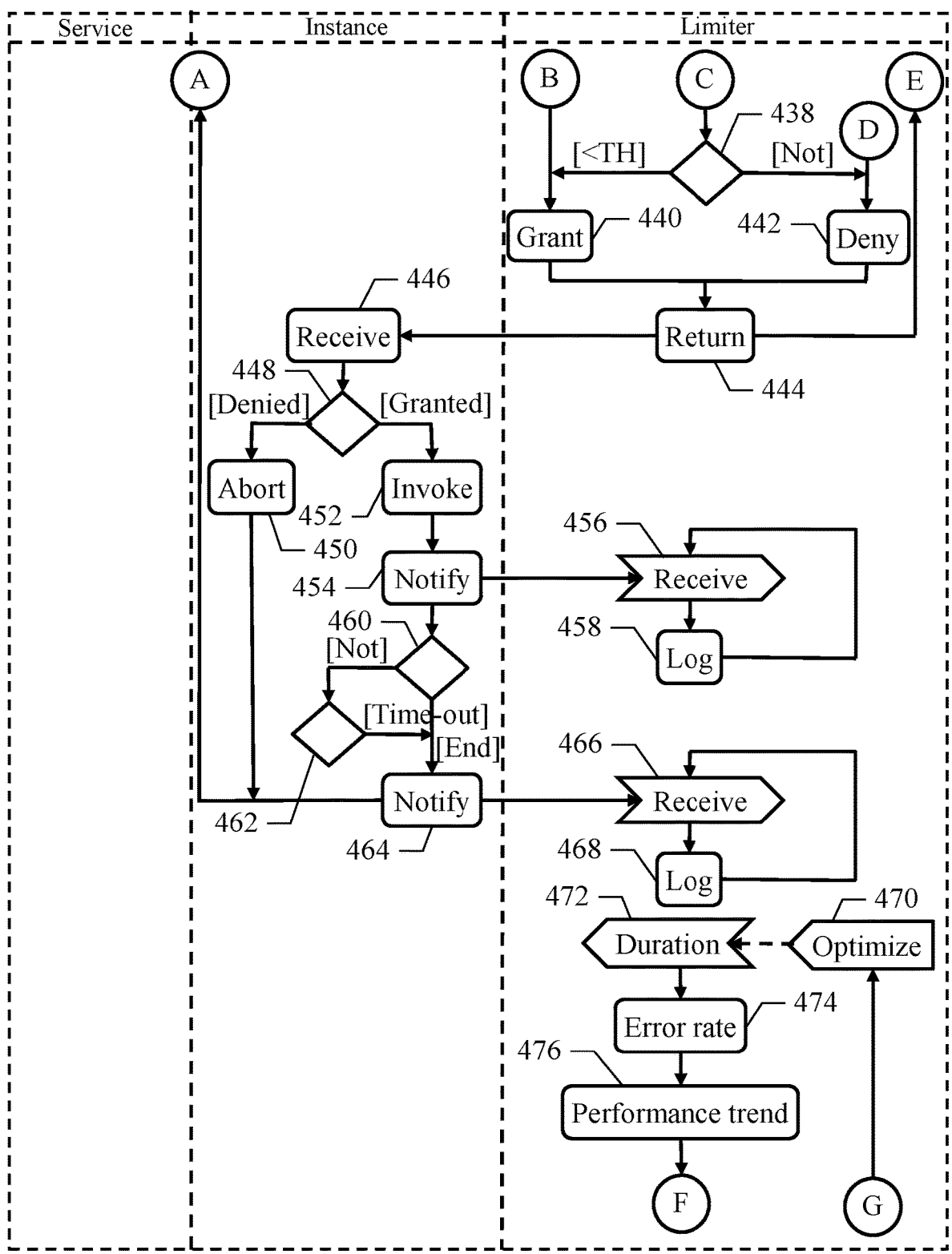
FIG. 4B show an activity diagram describing a flow of activities relating to an implementation of a solution according to an embodiment of the present disclosure.
Figure 4C:
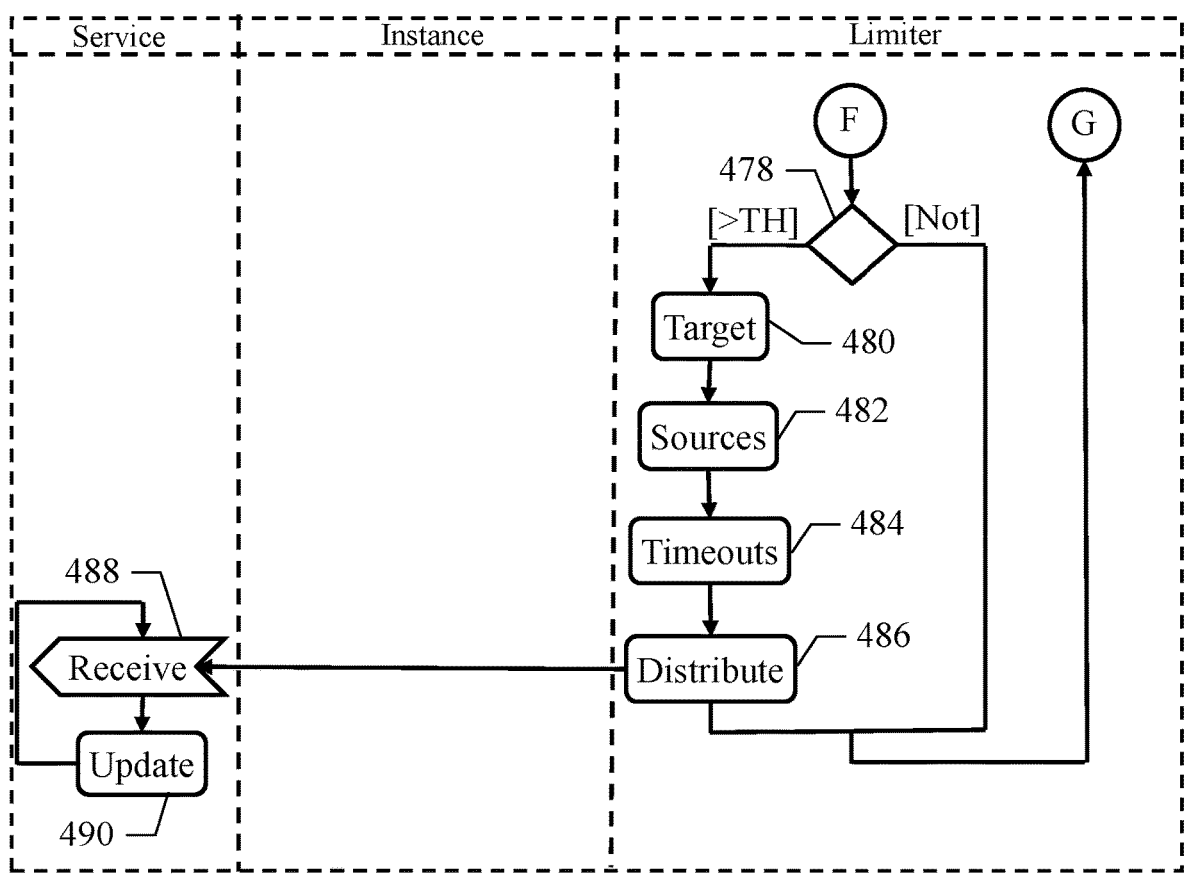
FIG. 4C show an activity diagram describing a flow of activities relating to an implementation of a solution according to an embodiment of the present disclosure.

With reference now to FIG. 4A—FIG. 4C, an activity diagram is shown describing the flow of activities relating to an implementation of the solution according to an embodiment of the present disclosure.

Particularly, the activity diagram represents an exemplary process that may be used to control the invocations of a generic integration point with a method 400. In this respect, each block may correspond to one or more executable instructions for implementing the specified logical function on the corresponding processing nodes.

Starting from the swim-lane of a (new) micro-service that needs to invoke the integration point, this micro-service (i.e., its first instance) at block 402 submits a corresponding registration request to the limiter (comprising a unique identifier of the new micro-service, a unique identifier of the integration point and a required slice of the target rate of the integration point to be reserved to the new micro-service). Moving to the swim-lane of the limiter, the subscriber (being in a listening condition) receives the registration request at block 404. The flow of activity branches at block 406 according to a condition of the integration point (as indicated by its configuration information retrieved from the corresponding repository). If a difference between the target rate of the integration point and the sum of the source rates of all the micro-services that are already registered with the integration point is higher than the slice of the target rate required by the new micro-service, it means that the integration point may tolerate the additional invocations thereof by the new micro-service. In this case, the subscriber at block 408 accepts the registration request of the new micro-service; for this purpose, the subscriber adds the identifier of the new micro-service and its source rate to the entry of the integration point in the configuration repository. Conversely, the subscriber at block 410 refuses the registration request of the new micro-service. The flow of activity merges again at block 412 from either the block 408 or the block 410. In both cases, the subscriber returns a response for the registration request to the new micro-service (indicating whether it has been accepted or refused, in the first case comprising the timeout of the integration point retrieved from the configuration repository). Returning to the swim-lane of the (new) micro-service, it receives this response from the limiter at block 414. Assuming that the registration request has been accepted, the micro-service saves the timeout of the integration point and then starts invoking it (conversely, an error condition is entered).

Whenever a (current) instance of any (current) micro-service registered with the integration point needs to invoke it, the current micro-service instance at block 416 submits an enablement request for a (new) invocation of the integration point to the limiter (comprising the identifier of the integration point and the identifier of the current micro-service). Moving to the swim-lane of the limiter, the enabler (being in a listening condition) receives the enablement request at block 418. In response thereto, the enabler at block 420 verifies the enablement of the new invocation. For this purpose, at first the enabler calculates a current rate of the invocations of the integration points by all the instances of the current micro-service (according to information retrieved from the log repository); for example, the current rate is given by the number of these invocations in a last timeframe (such as 20-60[s], like 30[s]) divided by the duration of the timeframe. The enabler at block 422 compares the current rate with the source rate of the current micro-service (retrieved from the configuration repository). If the current rate is not lower than the source rate, it means that the current micro-service instance would be not allowed to invoke the integration point.

In the solution according to an embodiment of the present disclosure, however, in this case the enabler estimates the serving probability of the integration point (indicative of its residual capability to serve the new invocation). For this purpose, the enabler at block 424 calculates a total rate of the invocations of the integration point by the instances of all the micro-services (according to information retrieved from the log repository); for example, the total rate is given by the number of these invocations in the last timeframe divided by its duration. The enabler at block 426 compares the total rate with the target rate (retrieved from the configuration repository). If the total rate is strictly lower than the target rate, it means that the instances of one or more other micro-services have invoked the integration point with corresponding current rates lower than their source rates, and then the integration point might tolerate further invocations thereof. In this case, the enabler commands the estimator to calculate an interference probability of the integration point. The interference probability is indicative of an interference of the new invocation with further invocations by the instances of the other micro-services in a short time. For this purpose, a loop is entered at block 428, wherein the estimator takes into account every (registered) micro-service that is registered with the integration point, apart from the current micro-service (starting from a first one in any arbitrary order, as indicated in the configuration repository). Continuing to block 430, as above the estimator calculates the current rate of the registered micro-service (equal to the number of corresponding invocations in the last timeframe, retrieved from the log repository, divided by the duration of the timeframe). The estimator at block 432 compares the current rate with the source rate of the registered micro-service (retrieved from the configuration repository). If the current rate is strictly lower than the source rate, it means that the instances of the registered micro-service are still allowed to invoke the integration point. In this case, the estimator at block 434 calculates a probability that any instance of the registered micro-service invokes the integration point within a time equal to the average duration of the invocations (retrieved from the statistics repository), given by the product between the current rate of the registered micro-service and the average duration. The estimator adds the value so obtained to the interference probability (initialized to zero). The process then continues to block 436; the same point is also reached directly from the block 432 if the current rate is not lower than the source rate of the registered micro-service (meaning that the registered micro-service is not allowed to invoke the integration point). The estimator now verifies whether a last registered micro-service has been processed. If not, the flow of activity returns to the block 428 to repeat the same operations on a next registered micro-service. Conversely (once all the registered micro-services have been processed), the loop is exit by descending into block 438. At this point, the estimator compares the interference probability with an (interference) threshold, for example, 0.1-0.3, such as 0.2. If the interference probability is (possibly strictly) lower than the interference threshold, it means that it is unlikely that the integration point will be invoked shortly by any instances of other micro-services allowed to do so (because they have not reached their source rates yet). Therefore, the process continues to block 440, wherein the enabler grants the enablement of the new invocation. In fact, the new invocation, even if exceeding the source rate of the current micro-service, should not interfere with operation of the other micro-services; as a consequence, the current micro-service is allowed to exploit the entitlement to invoke the integration point that is left-over by the other micro-services. The same point is also reached from the block 422 if the current rate is strictly lower than the source rate of the current micro-service, meaning that the current micro-service instance is allowed to invoke the integration point normally. Returning to the block 426, if the total rate is equal to the target rate, it means that the integration point is not capable of tolerating further invocations thereof. In this case, the enabler at block 442 denies the enablement of the new invocation. The same point is also reached from the block 438 if the interference probability is (possibly strictly) higher than the interference threshold, meaning that it is likely that the integration point will be invoked shortly by one or more instances of other micro-services allowed to do so (because they have not reached their source rates yet), so that the new invocation might interfere with their operation. The process then descends into block 444 from the block 440 or the block 442. At this point, the enabler returns a corresponding response for the enablement request of the new invocation (i.e., granted or denied) to the current micro-service instance.

Returning to the swim-lane of the (current) micro-service instance, the (current) micro-service instance receives this response from the limiter at block 446. The flow of activity then branches accordingly at block 448. If the enablement request of the (new) invocation has been denied, the micro-service instance at block 450 aborts the invocation of the integration point (for example, by entering an error condition or simply waiting for a certain delay before trying again the same operation). The process then returns to the block 416 waiting for the need of submitting a next invocation to the integration point. Referring back to the block 448, if instead the enablement request has been granted, the micro-service instance at block 452 submits the invocation so allowed to the integration point. At the same time, the micro-service instance at block 454 notifies the limiter accordingly, by sending it a corresponding start message (comprising the identifier of the integration point, the identifier of its micro-service and a start time of the invocation). Moving to the swim-lane of the limiter, the monitor (being in a listening condition) receives the start message at block 456. In response thereto, the monitor at block 458 updates the log repository accordingly. The process then returns to the block 456 waiting for a next start message. Referring back to the swim-lane of the micro-service instance, the process descends from the block 454 to block 460, wherein the micro-service instance verifies whether the invocation has been served by the integration point (as indicated by a corresponding return code). If not, the micro-service instance at block 462 verifies whether the timeout of the integration point (for example, retrieved from the corresponding micro-service) has expired. If not, the flow of activity returns to the block 460 to repeat the same operations continually. In any case, the process continues to block 464 from the block 460 once the invocation has been served by the integration point or from the block 462 once the timeout of the integration point has expired. At this point, the micro-service instance determines a result of the invocation; the result indicates a success of the invocation (in response to a positive return code) or a failure of the invocation (in response to a negative return code due to an error of the integration point or in response to the expiration of the timeout due to a missing response of the integration point). The micro-service instance notifies the limiter accordingly, by sending it a corresponding end message (comprising the identifier of the integration point, the identifier of its micro-service, an end time of the invocation and its result (succeeded/failed)). The process then returns to the block 416 waiting for the need of submitting a next invocation to the integration point. Moving to the swim-lane of the limiter, the monitor (being in a listening condition) receives the end message at block 466. In response thereto, the monitor at block 468 updates the log repository accordingly. The process then returns to the block 466 waiting for a next end message.

Still with reference to the swim-lane of the limiter, in a completely independent way the process passes from block 470 to block 472 as soon as an event occurs triggering an optimization of the integration point (for example, periodically according to the timeframe, every 30[s] in the example at issue). In response thereto, the analyzer calculates a new value of the average duration of the invocations (according to information retrieved from the log repository) and adds it to the statistics repository. For example, for each invocation comprised in the last timeframe (i.e., start time preceding a start of the optimization at most by the timeframe), the analyzer calculates the invocation's duration (equal to the difference between the corresponding end time and start time); the analyzer sets the new value of the average duration to the mean of the durations of the invocations in the last timeframe. Moreover, the analyzer at block 474 calculates a new value of the error rate of the invocations (according to information retrieved from the log repository) and adds the new value to the statistics repository. For example, the new value of the error rate is set to the number of invocations comprised in the last timeframe whose result is failed divided by the total number of invocations comprised in the last timeframe. The optimizer at block 476 calculates a performance trend of the integration point, based on a trend of the average duration and on a trend of the error rate. For example, the trend of the average duration and the trend of the error rate are set to the difference between their new value and their previous value (retrieved from the statistics repository), and the performance trend is then set to the mean of the trend of the average duration and the trend of the error rate. The flow of activity then branches at block 478 according to the performance trend. If the performance trend is (possibly strictly) higher in absolute value than a trend threshold (for example, 5-10%), the optimizer updates the configuration information of the integration point accordingly in the corresponding repository. For example, the optimizer at block 480 updates (increases/decreases) the target rate by a percentage of the performance trend (such as 50-100% thereof). As a consequence, the optimizer at block 482 updates (increases/decreases) the source rates of the micro-services registered with the integration point in the same way. Likewise, the optimizer at block 484 updates (increases/decreases) the timeout of the integration point by the same percentage of the performance trend. The optimizer at block 486 distributes the timeout of the integration point so updated to all the micro-services registered with it (as indicated in the configuration repository). The process then returns to the block 470 from the block 486 or directly from the block 478 when the performance trend is (possibly strictly) lower than the trend threshold, waiting for a next triggering of the optimization operation. At the same time in the swim-lane of each micro-service registered with the integration point, the micro-service (being in a listening condition) at block 488 receives the (updated) timeout distributed by the limiter at the block 486. In response thereto, the micro-service at block 490 saves the timeout (by replacing its previous value) making it available to all the instances of the micro-service (for example, by publishing it in a service registry). The process then returns to the block 488 waiting for a next update of the timeout. In this way, operation of the integration point (in terms of rate of invocations thereof) and of the micro-service instances (in term of rate of invocations of the integration point and in term of timeout before aborting them) self-adapt dynamically to the actual conditions of the integration point. Particularly, when the integration point has a temporary sufferance (for example, due to a workload peak of its processing node that reduces the performance thereof), the limiter reduces the rate of the integration point's invocations (reduced target/source rates), so as to allow the integration point still to serve its (lesser) invocations with acceptable performance; at the same time, the micro-service instances wait for a longer timeout before aborting the invocations of the integration point, so as to accept a slower response time thereof. Vice-versa, as soon as the normal performance of the integration point is restored or its performance increases (for example, due to a workload drop of its processing node), the limiter increases the rate of its invocations (increased target/source rates), so as to allow the integration point to serve its (higher) invocations with the desired performance; at the same time, the micro-service instances wait for a shorter timeout before aborting the invocations of the integration point (faster response time). All of the above provides a sort of distributed monitoring that allows each micro-service instance to adjust its invocations (number and response time) of the integration point dynamically.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling invocations of a target component by a plurality of source components in a software application. However, the target component and the source components may be in any number and of any type (for example, integration point and micro-services, generic software programs, jobs and so on) for use in any software application (for example, cloud application, SOA application, client-server application and so on).

In an embodiment, each source component is deployed with one or more instances thereof. However, the instances of each source component may be deployed in any number and in any way (for example, manually/automatically, to independent processing nodes or clusters of any number of cloud providers, to virtual machines, containers, physical machines and so on).

In an embodiment, the method comprises the following steps under the control of a computing system. However, the computing system may be of any type (see below).

In an embodiment, the method comprises associating (by the computing system) the source components with corresponding source rates of the invocations being reserved to the source components within a target rate of the invocations that are tolerated by the target component. However, the source rates and the target rate may be of any type (for example, defined in terms of number of invocations per time unit, total duration of the invocations per time unit and so on); moreover, the source rates may have any values (for example, selected by the source components, set automatically to a predefined percentage of the target rate and so on) and they may be associated with the source components in any way (for example, manually, upon request of the source components and so on).

In an embodiment, the method comprises monitoring (by the computing system) corresponding previous ones of the invocations by the instances of each of the source components. However, the monitoring may relate to any information relating to the previous invocations (for example, their start/end times, simply their submissions, their results, any combination thereof and so on) and it may be performed in any way (for example, by receiving corresponding notifications from the instances of the source components, by intercepting the invocations and so on).

In an embodiment, the method comprises receiving (by the computing system) an enablement request for a new one of the invocations from a current one of the instances of a current one of the source components. However, the enablement request may be received in any way (for example, via a message, a remote command and so on).

In an embodiment, the method comprises verifying (by the computing system) an enablement of the new invocation in response to the enablement request, the enablement being verified according to the source rate of the current source component and the previous invocations by the instances of the current source component. However, the enablement of the new invocation may be verified in any way (for example, by comparing the source rate with any current rate of the current source component calculated according to the previous invocations by its instances, such as in terms of their number, total duration and the like with reference to a last timeframe, a plurality of previous timeframes weighted according to their age, a trend over time and so on).

In an embodiment, the method comprises estimating (by the computing system) a serving probability indicative of a residual capability of the target component to serve the new invocation in response to a negative result of said verifying the enablement, the serving probability being estimated according to the target rate and the previous invocations by the instances of the source components. However, the serving probability may be estimated in any way (for example, according to any number and type of statistical parameters of the previous invocations by the instances of the source components, such as their total rate, average duration, standard deviation of rate/duration, any combination thereof and the like with reference to a last timeframe, a plurality of previous timeframes weighted according to their age, a trend over time and so on).

In an embodiment, the method comprises enabling (by the computing system) the new invocation according to the serving probability. However, the new invocation may be enabled in any way (for example, according to the value, the trend over time and the like of one or more components of the serving probability, by comparing them with the target rate, with corresponding thresholds and so on).

Further embodiments provide additional advantageous features, which may however be omitted at all in a basic implementation.

Particularly, in an embodiment said step of verifying the enablement of the new invocation comprises calculating (by the computing system) a current rate of the current source component according to the previous invocations by the instances of the current source component in a last timeframe. However, the timeframe may be of any type (for example, with any pre-defined duration, with a duration corresponding to any pre-defined number of previous invocations by the instances of the current source component, and so on).

In an embodiment, said step of verifying the enablement of the new invocation comprises determining (by the computing system) the enablement according to a comparison between the source rate and the current rate. However, the enablement may be set according to the comparison between the source rate and the current rate in any way (for example, by enabling the new invocation when the current rate is lower than the source rate, when the current rate is likely to remain lower than the source rate during the new invocation according to the current rate and an average duration of the previous invocations by the instances of the current source component in a last timeframe, and so on).

In an embodiment, the method comprises calculating (by the computing system) a total rate of the target component in response to a negative result of said verifying the enablement, the total rate being calculated according to the previous invocations by the instances of the source components in a last timeframe. However, the timeframe may be of any type and the total rate may be calculated in any way (for example, either the same or different with respect to the current rate).

In an embodiment, the method comprises enabling (by the computing system) the new invocation according to a comparison between the target rate and the total rate. However, the new invocation may be enabled according to the comparison between the target rate and the total rate in any way (for example, by further verifying whether the new invocation is likely to interfere with further invocations by the instances of the other source components when the total rate is lower than the target rate, by directly enabling the new invocation when the total rate is lower than the target rate in general or by at least a certain threshold, and so on).

In an embodiment, the method comprises calculating (by the computing system) an interference probability in response to the total rate being strictly lower than the target rate, the interference probability being indicative of an interference of the new invocation with further ones of the invocations by the instances of other ones of the source components different from the current source component. However, the interference probability may be calculated in any way (for example, as the probability that any further invocation is received during the new invocation, that the total rate remains lower than the target rate during the new invocation and so on).

In an embodiment, the method comprises enabling (by the computing system) the new invocation according to a comparison between the interference probability and an interference threshold. However, the interference threshold may have any value (for example, fixed, configurable, self-adapting dynamically according to the actual interferences and so on).

In an embodiment, the method comprises monitoring (by the computing system) corresponding durations of the previous invocations. However, the duration of the previous invocations may be monitored in any way (for example, by receiving notifications of the start and the end of the invocations from the instances of the source components, by intercepting the invocations and their return codes, any combination thereof and so on).

In an embodiment, the method comprises calculating (by the computing system) an average duration of the invocations according to the durations of the previous invocations. However, the average duration may be calculated in any way (for example, over any timeframe either the same or different with respect to above, as any central tendency parameter of the durations of the previous invocations, such as their mean, median, mode and the like of simple or weighted type, based on the durations of all the invocations or of the invocations by the instances of the current source component only, and so on).

In an embodiment, the method comprises calculating (by the computing system) the interference probability being indicative of the further invocations within the average duration. However, this interference probability may be calculated in any way (for example, according to the current rates of the other source components, such as their sum, average and the like, according to a trend of their invocations over time and so on).

In an embodiment, the method comprises determining (by the computing system) a performance trend of the target component according to the previous invocations. However, the performance trend may be of any type (for example, based on the trend of the error rate of the invocations, on the trend of their average duration, any combination thereof, such as based on their simple/weighted mean, sum, product, logic OR, logic AND so on) and it may be determined in any way (for example, with reference to timeframes of any duration, by comparing its value among any number of previous timeframes, by determining its change continually over a last timeframe, and so on).

In an embodiment, the method comprises updating (by the computing system) the target rate according to the performance trend. However, the target rate may be updated according to the performance trend in any way (for example, by updating the target trend by any delta value depending linearly/non-linearly on the performance trend, indiscriminately or only above a minimum value of the performance trend, with hysteresis and so on).

In an embodiment, the method comprises updating (by the computing system) the source rates according to said updating the target rate. However, the source rates may be updated according to the updating of the target rate in any way (for example, uniformly, proportionally to their value and so on).

In an embodiment, the method comprises updating (by the computing system) a timeout of the target component according to the performance trend. However, the timeout may be updated in any way (for example, either the same or different with respect to the target rate).

In an embodiment, the method comprises notifying (by the computing system) an indication of the timeout in response to said updating thereof to each of the source components to cause each of the instances thereof to invoke the target component according to the timeout. However, the timeout may be notified in any way (for example, by distributing, broadcasting, publishing and so on).

In an embodiment, the method comprises monitoring (by the computing system) corresponding results of the previous invocations. However, the results may be of any type (for example, successful/failed, response time, error, timeout and so on) and they may be monitored in any way (for example, by receiving notifications of the end of the invocations from the instances of the source components, by intercepting their return codes, any combination thereof and so on).

In an embodiment, the method comprises determining (by the computing system) a trend of an error rate of the previous invocations according to the results thereof. However, the trend of the error rate may be determined in any way (for example, with reference to timeframes of any duration, by comparing its value among any number of previous timeframes, by determining its change continually over a last timeframe, and so on).

In an embodiment, the performance trend is based on the trend of the error rate. However, the performance trend may be based on the trend of the error rate in any way (for example, simply set to it, contributing to it at any extent and so on).

In an embodiment, the method comprises determining (by the computing system) a trend of an average duration of the previous invocations according to the durations thereof. However, the trend of the average duration may be determined in any way (for example, either the same or different with respect to the trend of the error rate).

In an embodiment, the performance trend is based on the trend of the average duration. However, the performance trend may be based on the trend of the average duration in any way (for example, simply set to it, contributing to it at any extent and so on).

In an embodiment, the source components implement corresponding services. However, the services may be of any type (for example, standard, micro, nano and so on).

In an embodiment, the instances of each of the source components are deployed dynamically according to a workload of the source component. However, the instances of the services may be deployed dynamically in any way (for example, by each cloud manager, each cluster manager, a common resource manager and so on).

In an embodiment, the instances of one or more of the source components are implemented in one or more clusters each of a plurality of processing nodes. However, each source component may have its instances implemented in any processing nodes (for example, grouped in clusters each with any number of processing nodes, in independent processing nodes, any combination thereof and so on).

In an embodiment, the software application runs in a cloud environment. However, the cloud environment may be of any type (for example, IaaS, PaaS, SaaS or NaaS, public, hybrid or private, and so on).

In an embodiment, the instances of one or more of the source components are implemented by a plurality of cloud providers of the cloud environment. However, each source component may have its instances implemented by any cloud providers (for example, multiple cloud providers in any number, a single cloud provider and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises a computer readable storage medium that has program instructions embodied therewith; the program instructions are executable by a computing system to cause the computing system to perform the same method. However, the computer program may be implemented as a stand-alone module (limiter), as a plug-in for a pre-existing software application (for example, the target component itself) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, a virtual machine, a physical machine and so on) and it may control the invocations in any computing infrastructure (for example, distributed throughout a plurality of computing machines communicating among them via any local, wide area, global, cellular or satellite network and exploiting any type of wired and/or wireless connections).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device for a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   associating, by one or more computer processors, a plurality of source components in a software application with one or more corresponding source rates for invoking a target component in the software application, wherein the one or more corresponding source rates are within a target rate of an integration point for invoking the target component;
   monitoring, by the one or more computer processors, corresponding invocations of the target component by a number of instances of the plurality of source components, wherein the invocations of the target component self-adapt dynamically to contingent needs;
   receiving, by the one or more computer processors, an enablement request for a new invocation of the target component from a current instance of a current source component;
   verifying, by the one or more computer processors, an enablement of the new invocation based, at least on part, on: a source rate of the current source component, and corresponding invocations of the target component by a number of instances of the current source component;
   responsive to a negative result of the verifying, estimating, by the one or more computer processors, a serving probability indicative of a residual capability of the target component to serve the new invocation, wherein the serving probability is estimated based, at least in part, on: the target rate, and the invocations of the target component by the number of instances of the plurality of source components; and
   responsive to a threshold of the serving probability being lower than the target rate, enabling, by the one or more computer processors, the new invocation.

2. The method according to claim 1, wherein verifying the enablement of the new invocation further comprises:
   calculating, by the one or more computer processors, a current rate of invocations of the current source component according to one or more previous invocations by the instances of the current source component in a last timeframe; and
   determining, by the one or more computer processors, the enablement according to a comparison between the source rate and the current rate.

3. The method according to claim 1, further comprising:
   calculating, by the one or more computer processors, a total rate of the target component in response to a negative result of said verifying the enablement, the total rate being calculated according to one or more previous invocations by the instances of the source components in a last timeframe; and
   enabling, by the one or more computer processors, the new invocation according to a comparison between the target rate and the total rate.

4. The method according to claim 3, further comprising:
   calculating, by the one or more computer processors, an interference probability of an integration point in response to the total rate being strictly lower than the target rate, the interference probability being indicative of an interference of the new invocation with further ones of the invocations by the instances of other ones of the source components different from the current source component; and
   enabling, by the one or more computer processors, the new invocation according to a comparison between the interference probability and an interference threshold.

5. The method according to claim 4, further comprising:
   monitoring, by the one or more computer processors, corresponding durations of the previous invocations;
   calculating, by the one or more computer processors, an average duration of the invocations according to the durations of the previous invocations; and
   calculating, by the one or more computer processors, the interference probability being indicative of the further invocations within the average duration.

6. The method according to claim 1, further comprising:
   determining, by the one or more computer processors, a performance trend of the target component according to the previous invocations;
   updating, by the one or more computer processors, the target rate according to the performance trend; and
   updating, by the one or more computer processors, the source rates according to said updating the target rate.

7. The method according to claim 6, further comprising:
updating, by the one or more computer processors, a timeout of the target component according to the performance trend; and
notifying, by the one or more computer processors, an indication of the timeout in response to said updating thereof to each of the source components to cause each of the instances thereof to invoke the target component according to the timeout.

8. The method according to claim 6, further comprising:
monitoring, by the one or more computer processors, corresponding results of the previous invocations; and
determining, by the one or more computer processors, a trend of an error rate of the previous invocations according to the results thereof, the performance trend being based on the trend of the error rate.

9. The method according to claim 6, further comprising:
monitoring, by the one or more computer processors, corresponding durations of the previous invocations; and
determining, by the one or more computer processors, a trend of an average duration of the previous invocations according to the durations thereof, the performance trend being based on the trend of the average duration.

10. The method according to claim 1, wherein the source components implement corresponding services.

11. The method according to claim 1, wherein the instances of each of the source components are deployed dynamically according to a workload of the source component.

12. The method according to claim 1, wherein the instances of one or more of the source components are implemented in clusters, wherein each cluster comprises a plurality of processing nodes.

13. A computer program product for controlling invocations of a target component by a plurality of source components in a software application, the computer program product comprising:
one or more computer readable storage medium and program instructions stored on the one or more computer readable storage medium, the stored program instructions comprising:
program instructions to associate a plurality of source components in a software application with one or more corresponding source rates for invoking a target component in the software application, wherein the one or more corresponding source rates are within a target rate of an integration point for invoking the target component;
program instructions to monitor corresponding invocations of the target component by a number of instances of the plurality of source components, wherein the invocations of the target component self-adapt dynamically to contingent needs;
program instructions to receive an enablement request for a new invocation of the target component from a current instance of a current source component;
program instructions to verify an enablement of the new invocation based, at least on part, on: a source rate of the current source component, and corresponding invocations of the target component by a number of instances of the current source component;
program instructions to, responsive to a negative result of the verifying, estimate a serving probability indicative of a residual capability of the target component to serve the new invocation, wherein the serving probability is estimated based, at least in part, on: the target rate, and the invocations of the target component by the number of instances of the plurality of source components; and
responsive to a threshold of the serving probability being lower than the target rate, program instructions to enable the new invocation according to the serving probability.

14. The computer program product according to claim 13, the program instructions to verify the enablement of the new invocation further comprising:
program instructions to calculate a current rate of invocations of the current source component according to one or more previous invocations by the instances of the current source component in a last timeframe; and
program instructions to determine the enablement according to a comparison between the source rate and the current rate.

15. The computer program product according to claim 13, the stored program instructions further comprising:
program instructions to calculate a total rate of the target component in response to a negative result of said verifying the enablement, the total rate being calculated according to one or more previous invocations by the instances of the source components in a last timeframe; and
program instructions to enable the new invocation according to a comparison between the target rate and the total rate.

16. The computer program product according to claim 13, the stored program instructions further comprising:
program instructions to calculate an interference probability of an integration point in response to the total rate being strictly lower than the target rate, the interference probability being indicative of an interference of the new invocation with further ones of the invocations by the instances of other ones of the source components different from the current source component; and
program instructions to enable the new invocation according to a comparison between the interference probability and an interference threshold.

17. A computer system for controlling invocations of a target component by a plurality of source components in a software application, each of the source components being deployed with one or more instances thereof, wherein the computer system comprises:
one or more computer processors;
one or more computer readable storage media; and
program instructions stored on at least one of the one or more computer readable storage media for execution by at least one of the one or more computer processors, the stored program instructions comprising:
program instructions to associate a plurality of source components in a software application with one or more corresponding source rates for invoking a target component in the software application, wherein the one or more corresponding source rates are within a target rate of an integration point for invoking the target component;
program instructions to monitor corresponding invocations of the target component by a number of instances of the plurality of source components, wherein the invocations of the target component self-adapt dynamically to contingent needs;

program instructions to receive an enablement request for a new invocation of the target component from a current instance of a current source component;

program instructions to verify an enablement of the new invocation based, at least on part, on: a source rate of the current source component, and corresponding invocations of the target component by a number of instances of the current source component;

program instructions to, responsive to a negative result of the verifying, estimate a serving probability indicative of a residual capability of the target component to serve the new invocation, wherein the serving probability is estimated based, at least in part, on: the target rate, and the invocations of the target component by the number of instances of the plurality of source components; and responsive to a threshold of the serving probability being lower than the target rate, program instructions to enable the new invocation according to the serving probability.

18. The computer system according to claim 17, the program instructions to verify the enablement of the new invocation further comprising:

program instructions to calculate a current rate of invocations of the current source component according to one or more previous invocations by the instances of the current source component in a last timeframe; and program instructions to determine the enablement according to a comparison between the source rate and the current rate.

19. The computer system according to claim 17, the stored program instructions further comprising:

program instructions to calculate a total rate of the target component in response to a negative result of said verifying the enablement, the total rate being calculated according to one or more previous invocations by the instances of the source components in a last timeframe; and program instructions to enable the new invocation according to a comparison between the target rate and the total rate.

20. The computer system according to claim 17, the stored program instructions further comprising:

program instructions to calculate an interference probability of an integration point in response to the total rate being strictly lower than the target rate, the interference probability being indicative of an interference of the new invocation with further ones of the invocations by the instances of other ones of the source components different from the current source component; and program instructions to enable the new invocation according to a comparison between the interference probability and an interference threshold.

* * * * *